(12) United States Patent
Hegenbart et al.

(10) Patent No.: US 12,195,181 B2
(45) Date of Patent: Jan. 14, 2025

(54) FASTENING APPARATUS FOR FASTENING A FURNISHING COMPONENT TO AN ATTACHMENT STRUCTURE OF AN AIRCRAFT CABIN

(71) Applicant: Airbus Operations GmbH, Hamburg (DE)

(72) Inventors: Matthias Hegenbart, Hamburg (DE); Hermann Benthien, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 183 days.

(21) Appl. No.: 18/159,779

(22) Filed: Jan. 26, 2023

(65) Prior Publication Data
US 2023/0242256 A1 Aug. 3, 2023

(30) Foreign Application Priority Data
Jan. 31, 2022 (EP) ..................................... 22154253

(51) Int. Cl.
*F16B 5/12* (2006.01)
*B64D 11/00* (2006.01)

(52) U.S. Cl.
CPC ................. *B64D 11/00* (2013.01); *F16B 5/12* (2013.01)

(58) Field of Classification Search
CPC ........ F16B 5/12; F16B 37/08; F16B 37/0835; F16B 37/0842; F16B 37/0864;
(Continued)

(56) References Cited

U.S. PATENT DOCUMENTS 2,941,438 A * 6/1960 Hartwick ............ F16B 37/0835
411/432
3,561,316 A * 2/1971 Karges .................. F16B 21/165
411/354
(Continued)

FOREIGN PATENT DOCUMENTS

| DE | 102019101401 A1 | 7/2020 |
| DE | 102020108392 A1 | 9/2021 |
| WO | 2006123844 A1 | 11/2006 |

OTHER PUBLICATIONS

European Search Report dated Jun. 7, 2022; priority document.

*Primary Examiner* — Roberta S Delisle
(74) *Attorney, Agent, or Firm* — Greer, Burns & Crain, Ltd.

(57) ABSTRACT

An apparatus for fastening a component to an aircraft cabin attachment structure, the attachment structure having a fastening tube with a longitudinal axis. The apparatus has an internally bored sleeve rotatably positionable on the fastening tube and an external thread. A holding body connects to the component and has two spaced-apart limbs and a bearing surface enclosed by the limbs, and on which, an internal thread configured to the sleeve external thread, is arranged. A device fixes the holding body to the threaded sleeve and the fastening tube, the external and internal threads being non-self-locking. When the holding body internal thread presses against the threaded sleeve external thread, the threaded sleeve rotates until the external and internal threads align. The fixing device connects the threaded sleeve to the holding body in a rotationally fixed manner and fixes the holding body transversely with respect to the longitudinal axis.

10 Claims, 4 Drawing Sheets

(58) Field of Classification Search
CPC .............. F16B 37/0885; F16B 37/0892; Y10S 411/907–908; B64D 9/003; B64D 11/00
USPC ......................................... 411/432, 433, 512
See application file for complete search history.

(56) References Cited

U.S. PATENT DOCUMENTS

| | | | | |
|---|---|---|---|---|
| 4,408,721 | A | * | 10/1983 | Cohen .................. A61H 33/027 411/432 |
| 4,541,153 | A | * | 9/1985 | Schaty ..................... F16L 3/13 24/336 |
| 4,840,333 | A | * | 6/1989 | Nakayama ................ F16B 5/12 248/68.1 |
| 2005/0260895 | A1 | * | 11/2005 | Aoshima ................ F16L 3/237 439/752 |
| 2008/0210830 | A1 | * | 9/2008 | Sedivy ................... F16L 3/237 248/73 |
| 2018/0058609 | A1 | * | 3/2018 | Van Hulst ............... F16L 3/127 |
| 2021/0300560 | A1 | | 9/2021 | Benthien et al. |
| 2023/0213120 | A1 | * | 7/2023 | Lee ........................ F16L 3/237 248/68.1 |

\* cited by examiner

FASTENING APPARATUS FOR FASTENING A FURNISHING COMPONENT TO AN ATTACHMENT STRUCTURE OF AN AIRCRAFT CABIN

CROSS-REFERENCES TO RELATED APPLICATIONS

This application claims the benefit of the European patent application No. 22154253.3 filed on Jan. 31, 2022, the entire disclosures of which are incorporated herein by way of reference.

FIELD OF THE INVENTION

The present description relates to a fastening apparatus for fastening a furnishing component to an attachment structure of an aircraft cabin, to a cabin having at least one furnishing component fastened therein and to an aircraft comprising such a cabin and/or such a fastening apparatus.

BACKGROUND OF THE INVENTION

In a passenger aircraft, a passenger cabin is usually provided with a multiplicity of furnishing components. In this regard, the fuselage, which is constructed with the aid of a fuselage structure, is provided on its inner side with a multiplicity of holders which are individually matched to the furnishing components to be received. In the case of fuselage lengths much greater than 10 m, however, it is always necessary to factor in certain manufacturing tolerances which have to be taken into account when arranging holders. As furnishing components in the fuselage are intended to comply with a clearly predefined geometry, it is therefore necessary to adapt the individual holders to compensate for the production tolerances of the fuselage structure.

The compensation of such tolerances for adaptation of the visible contour in the interior of a cabin of an aircraft is time-consuming and may require screw connections to be opened and closed.

DE102019101401A1 discloses a fastening system for fastening components to a fuselage structure in an interior space of an aircraft, the fastening system having at least one holder which can be coupled to the fuselage structure, a holding strut which can be connected by a first end to the holder and which can be connected by a second end to a furnishing component or a holding element for a furnishing component, and an elongate basic body. The elongate basic body can be fastened to a plurality of first and/or second holders and is configured to introduce a force which acts along an axis of extent of the basic body into a plurality of first and/or second holders. Furthermore, a decoupling component is introduced between the basic body and the holding strut and is of at least partially ring-shaped configuration.

DE102020108392A1 discloses a fastening apparatus which permits a decoupled rotational attachment of cabin interior components to an attachment structure which is supported by a primary structure of the aircraft. The fastening apparatus comprises an inner sleeve which can be put over a predefined fastening tube. An outer sleeve may be rotatably fastened to the inner sleeve. The outer sleeve has a groove for centering the baggage compartment. The centering is effected by means of a holding element which is pushed onto the outer sleeve. The fastening apparatus can compensate for tolerances between the attachment structure and the cabin interior component and prevent the transmission of undesired forces and torques.

SUMMARY OF THE INVENTION

An object can be considered that of proposing an alternative fastening apparatus which, on the basis of an attachment structure, enables a rapid fastening of furnishing components which compensates for tolerances in a continuously variable manner.

A fastening apparatus for fastening a furnishing component to an attachment structure of an aircraft cabin is proposed, the attachment structure having at least one fastening tube with a longitudinal axis, the fastening apparatus having a threaded sleeve which has an inner bore, can be positioned rotatably on the fastening tube by means of the inner bore and has an external thread, a holding body which can be connected to the furnishing component and which has two spaced-apart limbs and a bearing surface which is enclosed by the limbs and on which an internal thread adapted to the external thread of the threaded sleeve is arranged, and a fixing device for fixing the holding body to the threaded sleeve and the fastening tube, the external thread and the internal thread not being of self-locking form, with the result that when the internal thread of the holding body is pressed against the external thread of the threaded sleeve, the threaded sleeve rotates until the external thread and the internal thread are aligned with one another, and the fixing device being configured to connect the threaded sleeve to the holding body in a rotationally fixed manner and to fix the holding body transversely with respect to the longitudinal axis of the fastening tube.

The fastening apparatus according to the invention is capable of allowing a continuously variable tolerance compensation when fastening a furnishing component in a cabin of an aircraft, with fastening means being automatically centered in relation to one another at the same time. To this end, an attachment structure is required which is arranged in the form of fastening tubes on a structure of the aircraft in question and which runs parallel to a longitudinal direction of the cabin. In this case, the fastening of the attachment structure is irrelevant to the subject matter of this description and is therefore not explained in a concrete manner.

The threaded sleeve is a hollow-cylindrical component which has an inner bore through which the fastening tube extends. In one embodiment, the threaded sleeve may be rotatably arranged directly on the fastening tube. It is also conceivable to arrange at least one further element between the threaded sleeve and the fastening tube and to thus achieve rotatability and, where appropriate, fixing of the threaded sleeve. The external thread has a suitable thread pitch in order to prevent a self-locking action. In addition to the actual thread pitch, the coefficient of friction of the thread and consequently of the material from which the threaded sleeve and/or the holding body are manufactured is also a factor and is correspondingly adapted in order to realize the fastening apparatus.

The holding body is an element which is attached to the furnishing component to be fastened. In this case, it is advisable to attach a plurality of holding bodies to each furnishing component, in order to achieve secure mounting. It is for example known from DE102020108392A1 to arrange substantially C-shaped holding bodies on the furnishing component and to latch them, by introduction onto the fastening tube, into fittings arranged thereon. According to the invention, the holding body may also be of C-shaped configuration and may have, for example, two spaced-apart limbs which are arranged parallel to one another and between which the bearing surface is arranged, and extends by way of example over 180° of the bearing surface. This region correlates with the threaded sleeve and has an internal thread which is adapted to the external thread. The bearing surface can consequently be placed onto the external thread.

In the case of aligned orientation of the internal thread and of the external thread, the internal thread and the external thread engage completely in one another, and the thread base of the internal thread is located at the smallest possible distance from thread flanks of the external thread and vice versa. However, when introducing the holding body onto the fastening tube in a blind manner, an arrangement aligned in this way can be expected only in exceptional cases. If the internal thread and the external thread do not mesh, the flanks of the internal thread exert a force which acts in an axial direction on the flanks of the external thread. As a result, owing to the lack of self-locking action, a rotation of the threaded sleeve is effected. The rotation ends exactly when the internal thread and the external thread are aligned with one another. The two threads then lie flush in or on one another and the holding body is in the provided end position. If the rotation of the threaded sleeve is prevented, a transmission of force between the thread flanks of the internal thread and of the external thread may occur.

The fixing device serves to fix the threaded sleeve in the final position of the holding body, such that a further rotation is precluded. By additional fixing of the holding body transversely with respect to the longitudinal axis of the fastening tube, it is also possible for the position thereof with respect to the fastening tube to be arrested, with the result that forces can be transmitted transversely with respect to the longitudinal axis between the fastening tube and the holding body.

Since a flush engagement of the threads in one another is achieved entirely independently of a tolerance-affected, axial starting position of the holding body during the introduction of the furnishing component, it is possible to achieve continuously variable compensation of manufacturing-related tolerances for the position of the holding body along the longitudinal axis of the fastening tube. Due to the configuration of the holding body, automatic centering of the holding body in relation to the fastening tube is also achieved. After the tolerance compensation, the holding body is fixed to the fastening tube by way of the fixing device and forces can be transmitted in the axial direction and transversely with respect to the fastening tube.

The fastening apparatus according to the invention consequently has significant advantages over the known prior art since, in addition to rapid assembly, continuously variable tolerance compensation and centering can be carried out in a very rapid and reliable manner in the case of blind assembly.

In an advantageous embodiment, the threaded sleeve is fixed in the axial direction to the fastening tube. An axial position of the threaded sleeve is thus fixed. In this case, it is conceivable for the fastening tube to have a plurality of latching recesses which are arranged in succession in the longitudinal direction and in which latching means can be latched for axial fixing of the threaded sleeve. During the final assembly process, a fastening tube may consequently be equipped with a plurality of threaded sleeves which are pushed onto the fastening tube. The threaded sleeves may subsequently be moved to provided positions along the fastening tube and be latched there to a corresponding latching recess. The latching recesses are preferably distributed equidistantly on the fastening tube and could, for instance, have a distance of 1 inch from one another. It goes without saying that other embodiments are possible in principle.

In an advantageous embodiment, the fastening tube has a transverse opening, the fixing device having a cylinder bushing element which is arranged in the fastening tube and which comprises a receiving bushing running transversely with respect to the longitudinal axis, and the fixing device having a ball lock pin which can be inserted through the holding body, the threaded sleeve and the transverse opening into the receiving bushing and be fixed therein. The cylinder bushing element is consequently embodied as a cylinder nut and is located within the fastening tube. Instead of a receiving thread, provision is made here of a receiving bushing which extends transversely with respect to the longitudinal axis of the fastening tube or of the cylinder bushing element. For insertion of the ball lock pin, the cylinder bushing element has to be positioned such that its receiving bushing is aligned with the transverse opening. The ball lock pin can then extend transversely with respect to the longitudinal axis of the fastening tube through the holding body, the threaded sleeve and the transverse opening into the receiving bushing. The ball lock pin has, at its end to be inserted, a ball which can be moved transversely with respect to a main extent direction of the ball lock pin. For insertion of the ball lock pin, the ball has to be moved into the ball lock pin, such that the end to be inserted has the smallest possible width. If the ball lock pin has been positioned in the receiving bushing, the ball can be moved out in order to fix the ball lock pin in the receiving bushing. As a result, the ball lock pin cannot be pulled out of the cylinder bushing element without release of the ball, with the result that the holding body is fixed in the transverse direction.

In an advantageous embodiment, the ball lock pin has a ball which can be brought into a released position by means of an active, electrically operable drive and which is configured to push back into a blocked position. During the assembly of the furnishing component, the ball lock pin may be moved by hand or by means of a tool transversely with respect to the fastening tube. This requires the ball to be moved in and subsequently moved out again. In order to make the assembly easier, an electric drive which controls the movement of the ball may be provided therefor. It is particularly advantageous if the electric drive is designed such that it can only move in or release the ball and, in a non-operated state, the ball always pushes into its moved-out position. The ball could, for instance, be arranged on the ball lock pin in a resilient manner and the electric drive could be configured to move in the ball counter to the spring force. All the ball lock pins of all the furnishing components to be fastened could be coupled to an electrical assembly line which can be connected to a mobile voltage source. The balls of the furnishing components to be fastened then move in or are released. The furnishing components are brought closer to the threaded sleeves and fastened there, and the voltage source can subsequently be disconnected again. This makes the construction of the fastening apparatus easier, since accessibility for a tool or the hand of a technician does not have to be provided. Different variants may be considered for the realization of the electric drive.

In an advantageous embodiment, the drive comprises an electroactive polymer which can be connected to a voltage source, such that insertion of the ball lock pin into the cylinder bushing element is made possible. When a voltage is applied, the electroactive polymer can carry out a contraction, which is used in this case to pull back the ball. A corresponding component composed of an electroactive polymer may be arranged within the ball lock pin and be coupled to the ball. If a voltage is applied, the corresponding component contracts, and due to the coupling to the ball, the latter is pulled back or released. The coupling may comprise a direct connection or an indirect connection. By way of example, it is conceivable for a spring which urges the ball into a moved-out position to be coupled directly to a component composed of an electroactive polymer. As a result of contraction of the component, the spring is also contracted, with the result that the ball is no longer urged outward, but rather, when the ball lock pin is inserted into the cylinder bushing element, does not block this movement.

In an advantageous embodiment, the threaded sleeve comprises a plurality of longitudinal slots in the external thread which run parallel to the longitudinal axis, the fixing device having a toothed plate which can be moved transversely with respect to the longitudinal axis onto the longitudinal slots. This does not impair the function of the external thread. Instead, an additional possibility of interacting with the threaded sleeve is produced. The threaded sleeve may comprise, on its lateral surface, a plurality of spaced-apart slots oriented parallel to the longitudinal axis. These are preferably arranged equidistantly from one another and distributed on the lateral surface. Form-fitting engagement between the toothed plate and at least one of the slots can counteract a rotation of the threaded sleeve. It is conceivable for the fixing device to therefore comprise a toothed plate with a plurality of spaced-apart teeth which can engage in the slots of the threaded sleeve. This could already be achieved by bringing the fixing apparatus closer to the threaded sleeve. Depending on the number of slots and the size of the teeth of the toothed plate, it is possible to adjust the axial position with a resolution in the range of a few hundredths of millimeters.

In an advantageous embodiment, the cylinder bushing element is adhesively bonded into the fastening tube by means of a pliable elastic compound. Consequently, the cylinder bushing element is adhesively bonded at a predefined position, but allows a certain degree of movability on account of the elasticity of the compound. Due to the elastic compound, a damping function is achieved, with the result that the cylinder bushing element does not rattle in the fastening tube and shock loads can be mitigated.

The invention also relates to a cabin for an aircraft, having at least one furnishing component which is fastened in the cabin by means of at least one fastening apparatus according to the preceding description.

The invention also relates to an aircraft having at least one fastening apparatus according to the preceding description and/or at least one cabin as described above.

BRIEF DESCRIPTION OF THE DRAWINGS

Exemplary embodiments are discussed in more detail below with reference to the appended drawings. The illustrations are schematic and not to scale. Identical reference signs refer to identical or similar elements. In the drawings.

DETAILED DESCRIPTION OF THE PREFERRED EMBODIMENTS

Figure 1:
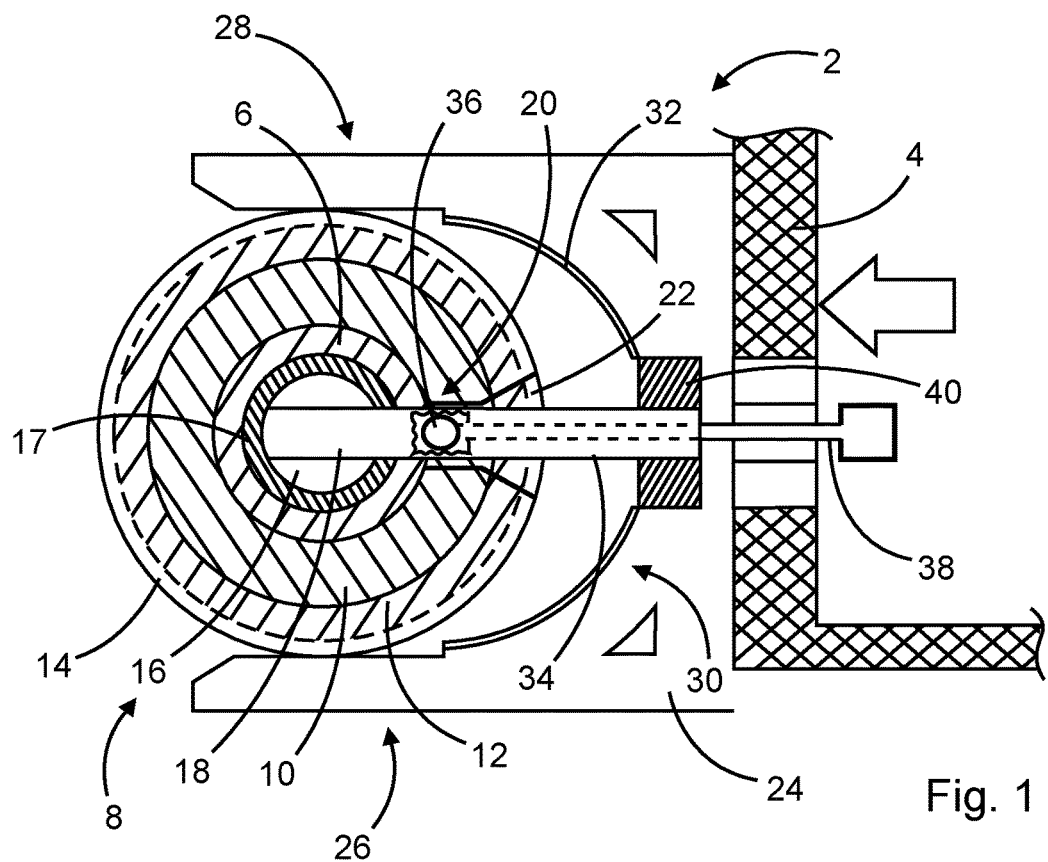
FIGS. 1 and 2 show a schematic illustration of a fastening apparatus in two successive assembly steps according to a first exemplary embodiment.

FIG. 1 shows a fastening apparatus 2 which is arranged on a furnishing component 4 and which can connect the latter to a fastening tube 6 of an attachment structure 8 of an aircraft cabin. The fastening tube 6 has a hollow-cylindrical cross section and is in a sectional illustration perpendicular to its longitudinal axis here.

A first bushing 10 is arranged on the fastening tube 6 and connected thereto in a rotationally fixed manner A threaded sleeve 12 comprising an external thread 14 is located on the first bushing. The threaded sleeve 12 is rotatably mounted on the first sleeve 10, such that the threaded sleeve 12 can rotate freely around the first sleeve 10 without the action of other components.

Arranged in the interior of the fastening tube 6 is a cylinder bushing element 16 which comprises a receiving bushing 18 running transversely with respect to the longitudinal axis. The cylinder bushing element 16 may be adhesively bonded in the fastening tube 6 by means of an elastic compound 17 and may in this case be positioned in a slightly yielding manner. As an alternative, a torsion spring may be provided for flexible holding of the cylinder bushing element 16. In aligned orientation with the cylinder bushing element 16, the fastening tube 6 has a transverse opening 20 through which access through the first sleeve 10 and the threaded sleeve 12 is provided. An opening 22 in the threaded sleeve 12 may widen outwardly to some extent from the first sleeve 10.

The fastening apparatus 2 also has a holding body 24 which is screw-fastened to the furnishing component 4. The holding body has a first limb 26 and a second limb 28 which is arranged parallel thereto and spaced apart therefrom. The two limbs 26 and 28 enclose a bearing surface 30 on which an internal thread 32 is arranged. The internal thread 32 is configured to be complementary to the external thread 14. In addition, the bearing surface 30 is designed in such a way that it correlates with the outer shape of the threaded sleeve 12. Consequently, the holding body 24 can be pushed against the threaded sleeve 12, automatic centering of the holding body 24 with respect to the fastening tube 6 being effected by the two limbs 26 and 28. If the two threads 32 and 14 are, however, not completely aligned, the threaded sleeve 12 may rotate slightly about the longitudinal axis until the respective thread flanks are oriented flush with one another. The threads 32 and 14 are therefore configured such that no self-locking action is produced and consequently rotation of the threaded sleeve 12 is always effected during the pushing-on of the holding body 24 and the threads 32 and 14 are consequently oriented with respect to one another.

A ball lock pin 34 may be introduced radially from the outside through the opening 22 in the threaded sleeve 12 and the transverse opening 20 in the fastening tube 6 into the receiving bushing 18 of the cylinder bushing element 16. Since the threaded sleeve 12 may rotate by a small angular extent for orientation of the thread flanks, the opening 22 in the threaded sleeve 12 is widened to some extent in the radial direction for this purpose. A ball 36 located in the ball lock pin 34 is in a moved-in or released position during the insertion by way of an actuating device 38, with the result that the ball lock pin 34 can be inserted without resistance into the receiving bushing 18.

Furthermore, the threaded sleeve 12 may have a plurality of channels which run in the longitudinal direction and which may be brought into form-fitting engagement with a toothed plate 40 in order to counteract a rotation of the threaded sleeve 12. This principle is explained in more detail in FIGS. 3A and 3B. By way of example, the toothed plate 40 is arranged in the holding body 24 and reaches the external thread 14 when the holding body 24 has been pushed on completely. The particular advantage of the fastening apparatus 2 is that automatic centering is effected, and at the same time continuously variable tolerance compensation is achieved and rapid fastening can be realized. The threads 32 and 14 run in one another in a flush manner, such that, as a result, a force can be transmitted along the longitudinal axis of the fastening tube.

Figure 2:
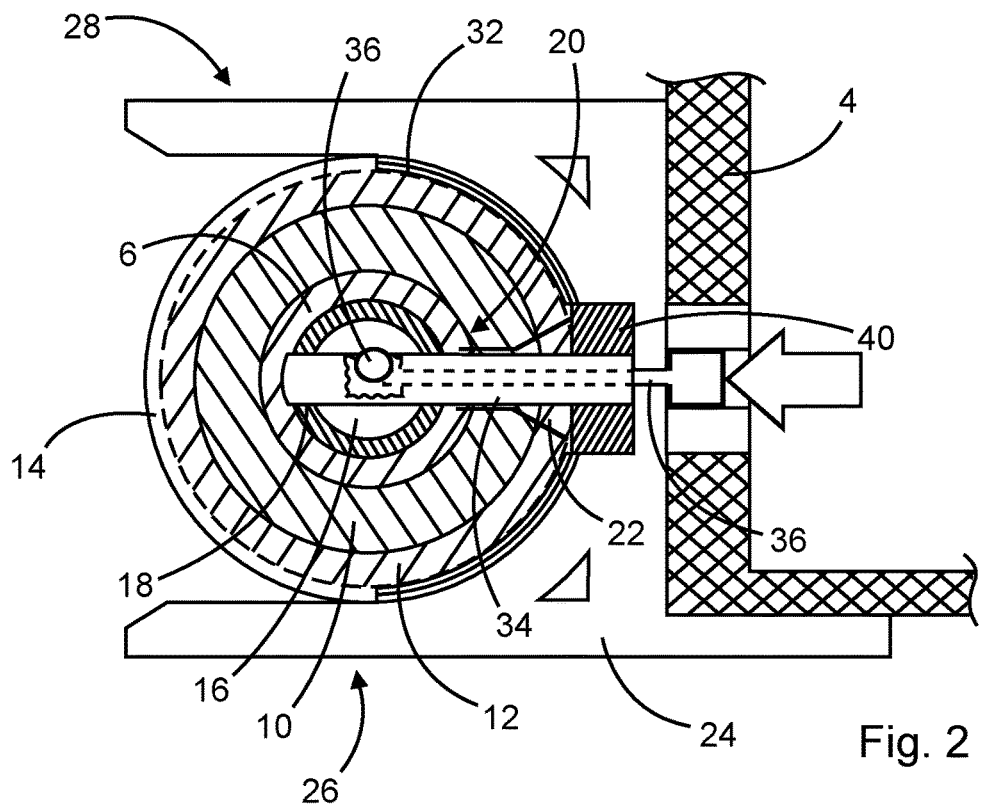

In FIG. 2, the holding body 24 has been pushed completely onto the threaded sleeve 12 and the ball lock pin 34 has been introduced completely into the cylinder bushing element 16. The actuating device 38 has also been pushed into the ball lock pin 34, such that the ball 36 is pushed outward in the radial direction. The ball lock pin 34 is thus connected to the cylinder bushing element 16. At the same time, the toothed plate 40 is pushed onto the channels (see FIGS. 3A and 3B) of the external thread 14 and the holding body 24 is held on the threaded sleeve 12 by the ball lock pin 34.

Figure 3A:
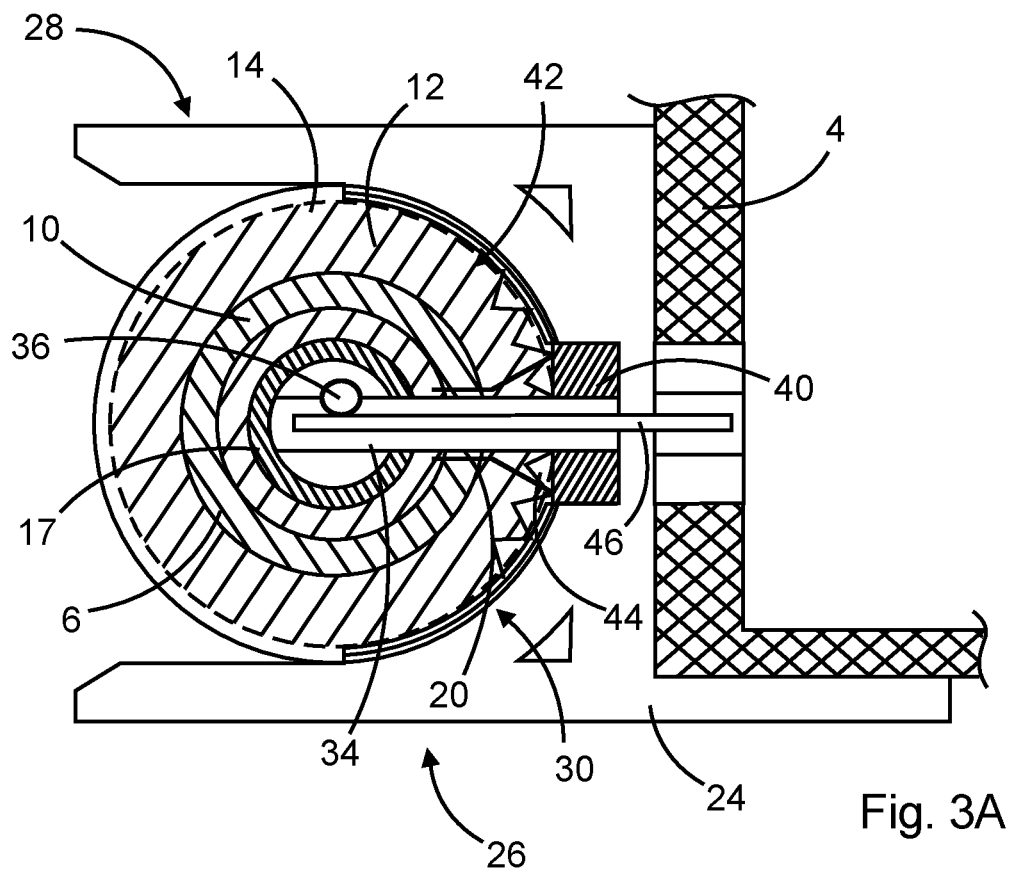
FIGS. 3A-3B show details relating to the first exemplary embodiment in two different illustrations.
Figure 3B:
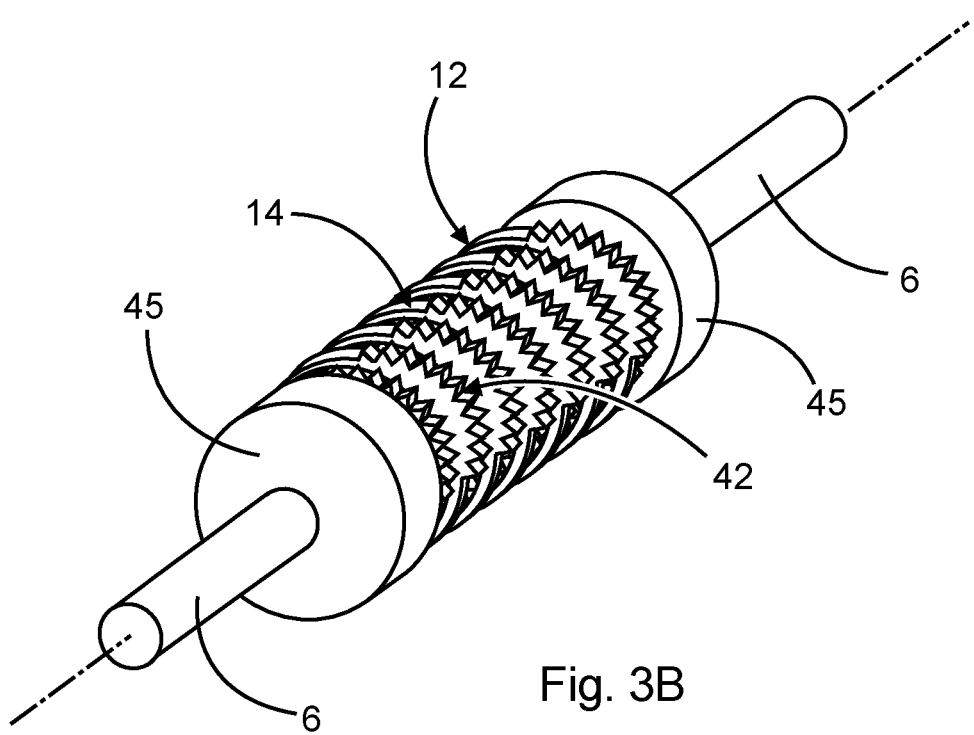

FIGS. 3A and 3B show the threaded sleeve 12 with longitudinal slots 42 arranged therein. These run on a part of the threaded sleeve 12 and extend parallel to the longitudinal axis of the fastening tube 6. The toothed plate 40 has teeth 44 which correspond to the slots 42 and which come into engagement with the slots 42 during the attachment of the ball lock pin 34 or during the introduction of the holding body 24. The threaded sleeve 12 is then protected against further rotation.

In addition, FIG. 3B shows a schematic, three-dimensional view of axial stops 45 which are connected to the fastening tube 6 and which are configured to hold the threaded sleeve 12 in its axial position. In a particularly simple form, these could also be securing rings or a latching mechanism, such as shown in DE102020108392A1.

In FIG. 3A, an electric drive 46 in the form of a component composed of an EAP (electroactive polymer) is also integrated into the ball lock pin 34. The component 46 can be compressed by application of a suitable voltage, with the result that it pulls back from the ball 36. However, if the voltage on the component 46 is removed, the component expands again and the ball 36 is pushed back into the moved-out position. The voltage could, for instance, be applied at a connection which is accessible from within the furnishing component during the assembly and which can be covered after the assembly. For this purpose, the connection could, for instance, be arranged in a recess or a cutout of the furnishing component.

Figure 4:
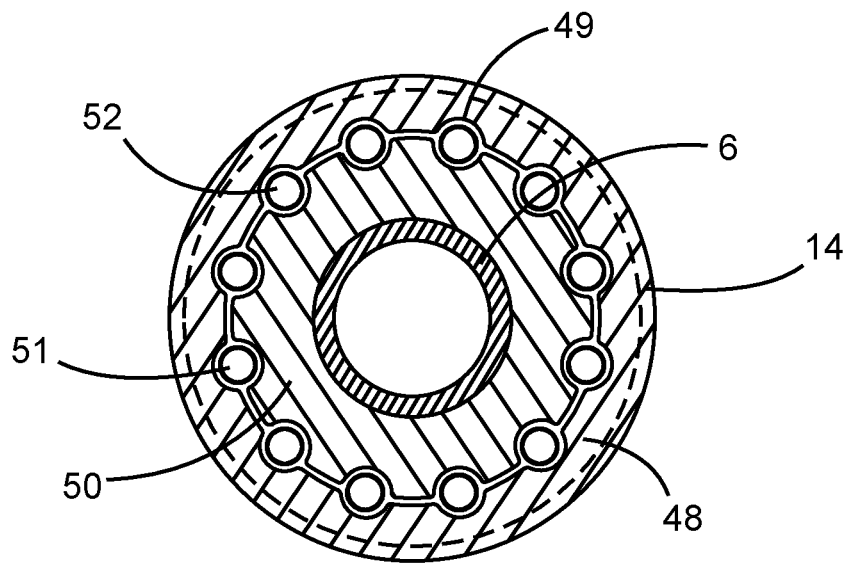
FIG. 4 shows an alternative anti-rotation means.

FIG. 4 illustrates another variant of an anti-rotation means of the threaded sleeve 12. Here, the threaded sleeve 48 has longitudinal channels 49 on its inner circumference. A first sleeve 50 has longitudinal channels 51 on its outer circumference. The outer diameter of the first sleeve 50 in this case corresponds substantially to the inner circumference of the threaded sleeve 48. The two sleeves 48 and 50 can consequently rotate in relation to one another. If, however, at least one pin 52 is brought into two longitudinal channels 49 and 51 which are aligned with one another, the two elements are secured against rotation in relation to one another.

Other embodiments, which may also be combined with components composed of electroactive polymer, are conceivable.

Figure 5:
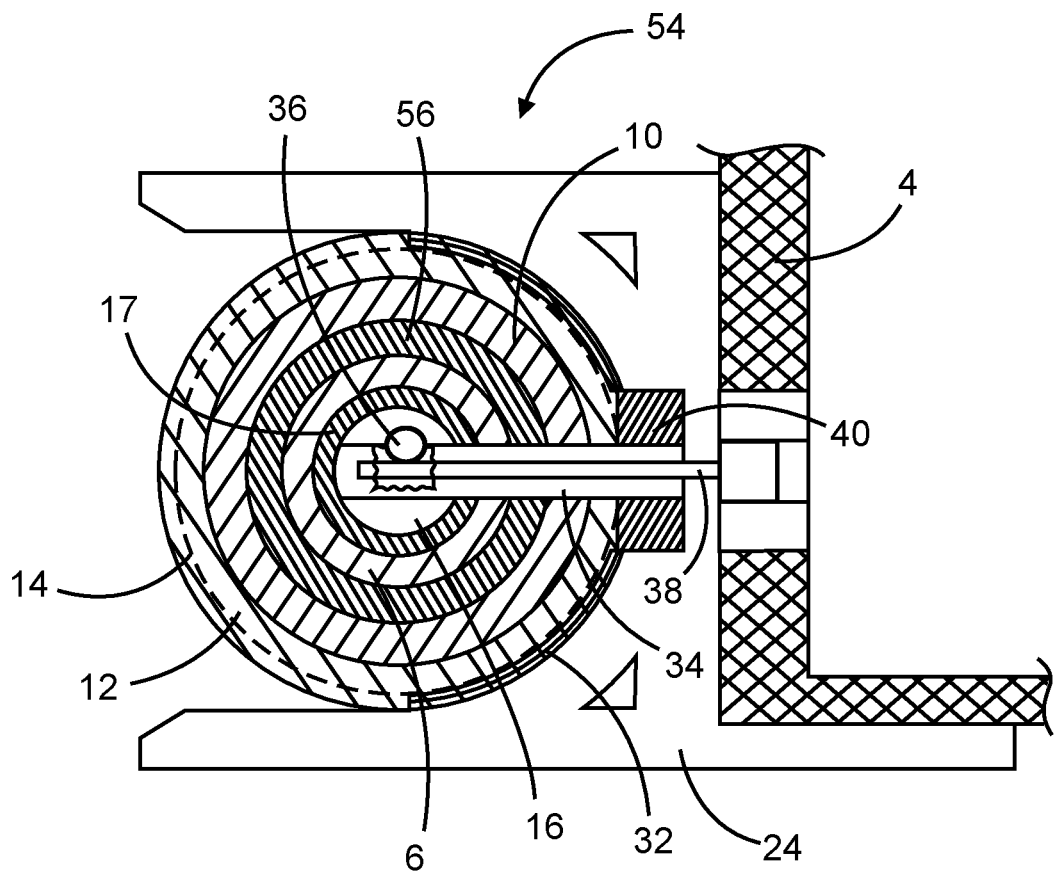
FIG. 5 shows a further exemplary embodiment with integrated shock absorber.

FIG. 5 shows a fastening apparatus 54 based on the exemplary embodiment from FIGS. 1 and 2 with a modification. Here, an additional, sleeve-like shock absorber 56 composed of an elastic material is provided, which is arranged between the fastening tube 6 and the first sleeve 10.

In this way, the introduction of load shocks from the furnishing component 4 into the fastening tube 6 is reduced even further.

Figure 6:
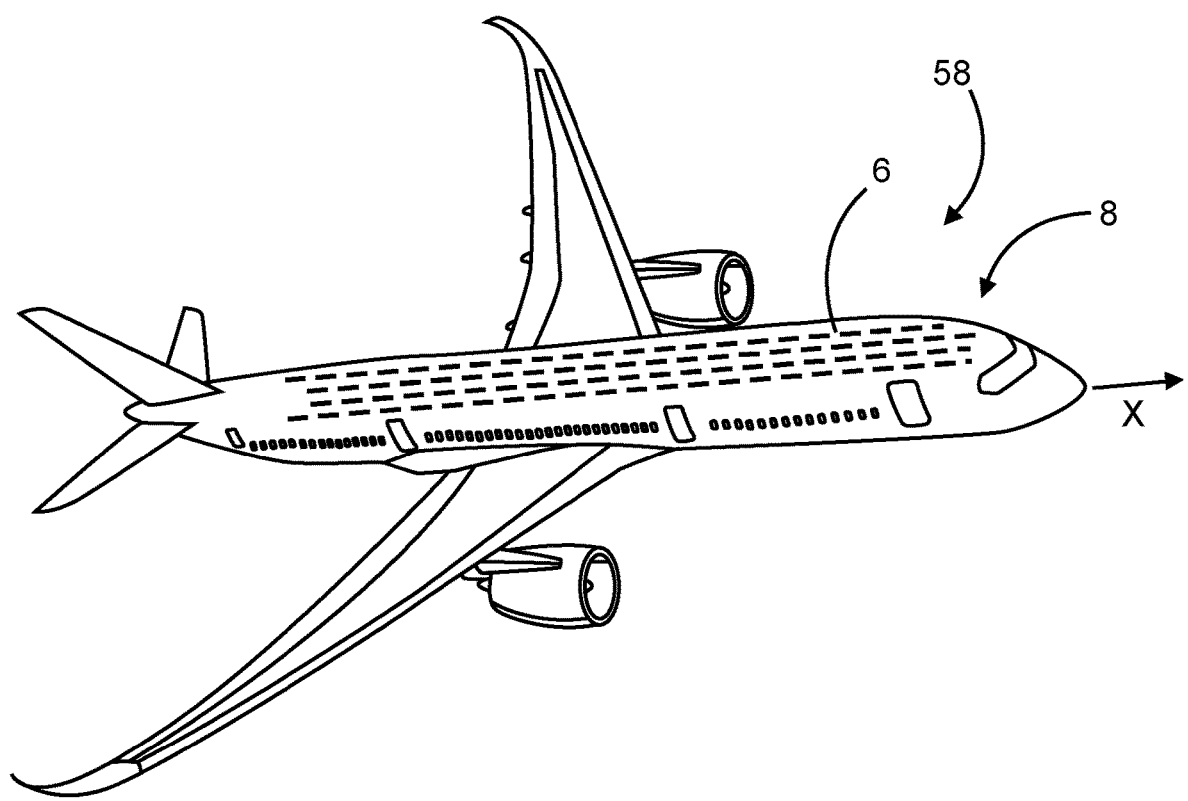
FIG. 6 shows an aircraft.

Lastly, FIG. 6 shows an aircraft 58 which has an attachment structure 8 with a plurality of fastening tubes 6 running parallel to a longitudinal axis x. Furnishing components 4 can be attached thereto by means of a fastening apparatus 2 or 54

It should additionally be pointed out that "comprising" or "having" does not rule out other elements or steps, and "a" or "an" do not rule out a multiplicity. It is also pointed out that features or steps that have been described with reference to one of the above exemplary embodiments may also be used in combination with other features or steps of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

2 Fastening apparatus
4 Furnishing component
6 Fastening tube
8 Attachment structure
10 First sleeve
12 Threaded sleeve
14 External thread
16 Cylinder bushing element
17 Elastic compound
18 Receiving bushing
20 Transverse opening
22 Opening
24 Holding body
26 First limb
28 Second limb
30 Bearing surface
32 Internal thread
34 Ball lock pin
36 Ball
38 Actuating device
40 Toothed plate
42 Longitudinal slot
44 Teeth
45 Axial stop
46 Component/EAP
48 Threaded sleeve
49 Longitudinal channel
50 First sleeve
51 Longitudinal channel
52 Pin
54 Fastening apparatus
56 Shock absorber
58 Aircraft

The invention claimed is:

1. A fastening apparatus for fastening a furnishing component to an attachment structure of an aircraft cabin, the attachment structure comprising at least one fastening tube with a longitudinal axis, the fastening apparatus comprising:
 a threaded sleeve which has an inner bore, positioned rotatably on the fastening tube by means of the inner bore and having an external thread,
 a holding body connected to the furnishing component and having two spaced-apart limbs and a bearing surface enclosed by the limbs and on which an internal thread configured to the external thread of the threaded sleeve is arranged, and
 a fixing device for fixing the holding body to the threaded sleeve and the fastening tube,
 the external thread and the internal thread not being of self-locking form, with a result that when the internal thread of the holding body is pressed against the external thread of the threaded sleeve, the threaded sleeve rotates until the external thread and the internal thread are aligned with one another, and
 the fixing device being configured to connect the threaded sleeve to the holding body in a rotationally fixed manner and to fix the holding body transversely with respect to the longitudinal axis of the fastening tube.

2. The fastening apparatus as claimed in claim 1, wherein the threaded sleeve is fixed in an axial direction to the fastening tube.

3. The fastening apparatus as claimed in claim 1, wherein the fastening tube has a transverse opening,
 the fixing device has a cylinder bushing element arranged in the fastening tube and comprises a receiving bushing running transversely with respect to the longitudinal axis, and
 the fixing device has a ball lock pin insertable through the holding body, the threaded sleeve and the transverse opening into the receiving bushing and being fixable therein.

4. The fastening apparatus as claimed in claim 3, wherein the ball lock pin has a ball configured to be brought into a released position by means of an active, electrically operable drive and being configured to push back into a blocked position.

5. The fastening apparatus as claimed in claim 4, wherein the drive comprises an electroactive polymer configured to be connected to a voltage source, such that insertion of the ball lock pin into the cylinder bushing element is made possible.

6. The fastening apparatus as claimed in claim 3, wherein the cylinder bushing element is adhesively bonded into the fastening tube by means of a pliable elastic compound.

7. The fastening apparatus as claimed in claim 1,
 wherein the threaded sleeve comprises a plurality of longitudinal slots in the external thread which run parallel to the longitudinal axis, and
 wherein the fixing device has a toothed plate configured to be moved transversely with respect to the longitudinal axis onto the longitudinal slots.

8. A cabin for an aircraft, having at least one furnishing component which is fastened in the cabin by means of at least one fastening apparatus as claimed in claim 1.

9. An aircraft having at least one cabin as claimed in claim 8.

10. An aircraft having at least one fastening apparatus as claimed in claim 1.

* * * * *